United States Patent [19]

Bartoschek et al.

[11] 4,282,015
[45] Aug. 4, 1981

[54] METHOD OF AND APPARATUS FOR REGENERATING AN ADSORPTION AGENT

[75] Inventors: Ernst Bartoschek, Leitershofen; Emil Christof, Augsburg, both of Fed. Rep. of Germany

[73] Assignee: Böwe Maschinenfabrik GmbH, Augsburg, Fed. Rep. of Germany

[21] Appl. No.: 37,830

[22] Filed: May 10, 1979
(Under 37 CFR 1.47)

[30] Foreign Application Priority Data

May 12, 1978 [DE] Fed. Rep. of Germany ....... 2820771

[51] Int. Cl.³ ............................................ B01D 53/04
[52] U.S. Cl. ..................................... 55/179; 55/208; 55/387
[58] Field of Search ...................... 55/20, 59, 74, 163, 55/179, 208, 387, 61

[56] References Cited

U.S. PATENT DOCUMENTS

| | | | |
|---|---|---|---|
| 1,595,683 | 8/1926 | Burrell et al. | 55/59 |
| 1,616,242 | 2/1927 | Voress et al. | 55/59 |
| 2,114,810 | 4/1938 | Ray | 55/179 X |
| 2,428,885 | 10/1947 | Luaces | 55/179 X |
| 2,818,133 | 12/1957 | Rosenthal | 55/59 |
| 2,910,137 | 10/1959 | Victor | 55/59 X |
| 3,359,706 | 12/1967 | Zankey | 55/179 X |
| 3,455,089 | 7/1969 | Mattia | 55/179 X |
| 3,540,188 | 11/1970 | Barrere, Jr. et al. | 55/20 |
| 3,728,074 | 4/1973 | Victor | 55/59 X |
| 3,731,460 | 5/1973 | Narumi | 55/179 |
| 4,021,211 | 5/1977 | Turek et al. | 55/59 X |
| 4,074,984 | 2/1978 | Fuhring | 55/179 X |

FOREIGN PATENT DOCUMENTS

| | | | |
|---|---|---|---|
| 66114 | 11/1965 | Australia | 55/61 |
| 542991 | 10/1927 | Fed. Rep. of Germany | 55/59 |
| 514722 | 11/1939 | United Kingdom | 55/59 |

Primary Examiner—Robert H. Spitzer
Attorney, Agent, or Firm—Karl F. Ross

[57] ABSTRACT

An adsorber system wherein an air/vapor mixture is alternatively fed to a pair of functionally interchangeable adsorbers and the vapor is removed from the air in one of these adsorbers while the other adsorber is subjected to regeneration with steam, and the two adsorbers are then functionally interchanged so that the regenerator adsorber recovers vapor from the mixture and the other adsorber is then subjected to steam regeneration. An adsorber to be regenerated is connected to an adsorber operating to remove vapor from the mixture at one side of the adsorber to be regenerated and steam to the adsorber to be regenerated is admitted from the other side thereof, thereby driving air containing vapor from the adsorber to be regenerated into the other adsorber. Upon the displacement of air from the adsorber to be regenerated the connection between the adsorbers is blocked and the steam with vapor desorbed from the adsorber to be regenerated is led to a condenser in which steam and vapor are condensed and liquid of the vapors is separated from water.

1 Claim, 2 Drawing Figures

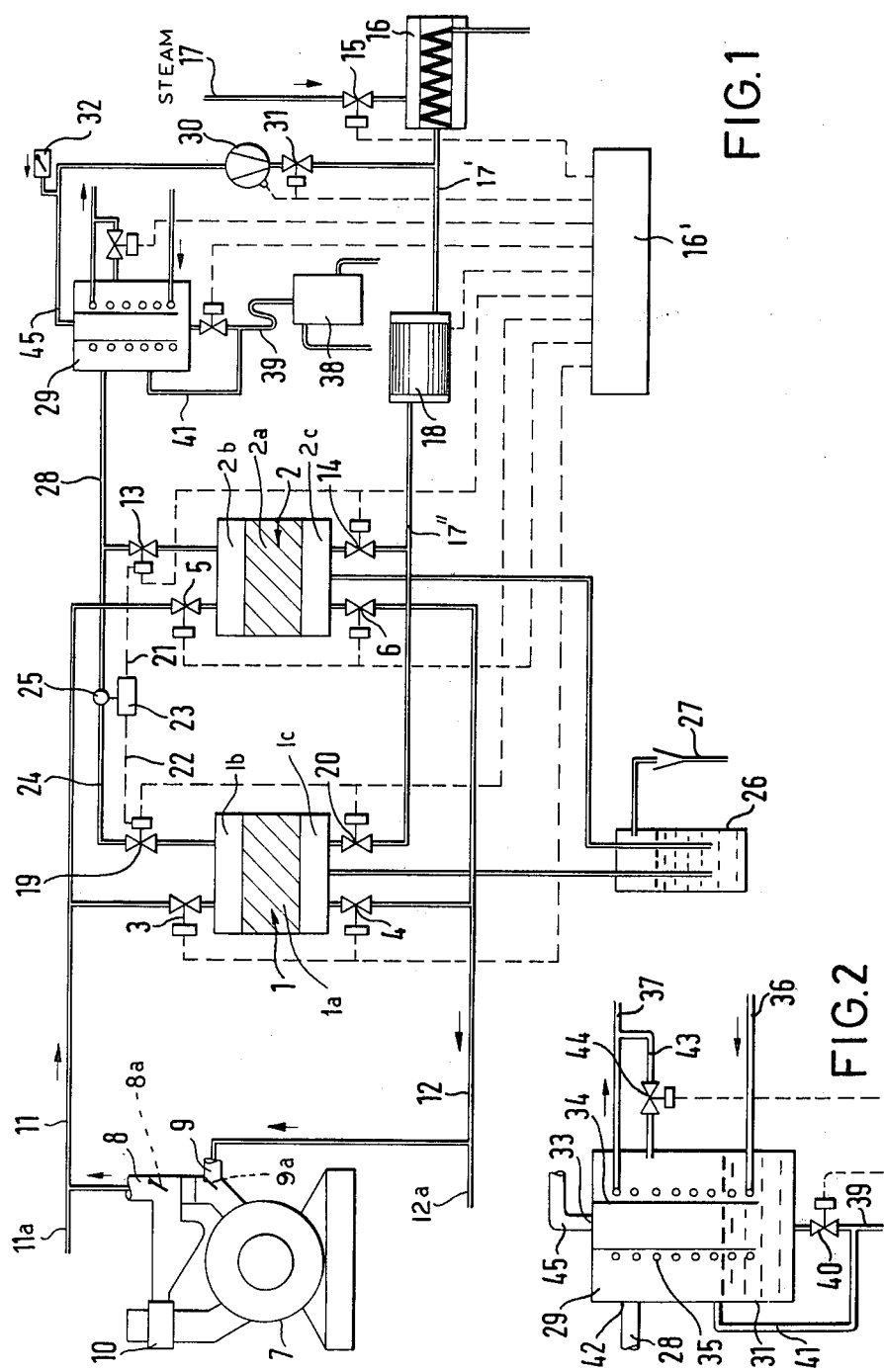

METHOD OF AND APPARATUS FOR REGENERATING AN ADSORPTION AGENT

FIELD OF THE INVENTION

The present invention relates to a method of and to an apparatus for the regeneration of an adsorbent of one of two adsorbent-filled receptacles in which steam is conducted through the receptacle containing the adsorbent to be regenerated to a condenser while the other receptacle, with yet unsaturated adsorbent, remains ready for the absorption, of a gaseous substance.

BACKGROUND OF THE INVENTION

In the recovery of gaseous substances from air, e.g. solvent vapors from the solvent-containing air driven off or released from dry-cleaning, degreasing and like machinery, it is known to circulate the air over an adsorbent through a receptacle containing same and, in a closed path, back to the machine in order to prevent release of air containing solvent-vapor residue, into the atmosphere.

In general, an adsorption installation for this purpose operates with two receptacles in which one is always in an operative mode for adsorbing solvent vapors from the air of the machine while the adsorbent is regenerated in the other by treatment of the adsorbent with steam.

In such regenerating or adsorbent systems, the steam, after traversing the adsorption agent (e.g. activated carbon) is passed into a condenser in which it is condensed together with the entrained solvent vapors.

The vapor-containing air within the receptacle to be regenerated, prior to the introduction of the steam, is usually vented into the atmosphere by being expressed from the steam through the condenser and the associated water separator which separates the condensed solvent from the condensed water. As a result, small quantities of air and entrained solvent vapors are released into the environment, i.e. solvent vapors are carried into the atmosphere.

OBJECTS OF THE INVENTION

It is the principal object of the present invention to provide a method of regenerating an adsorbent for the purposes described whereby the aforementioned disadvantage is avoided, i.e. practically no solvent vapors are released into the atmosphere.

Still another object of the invention is to provide an improved apparatus for the regeneration of a solvent-saturated adsorbent without releasing even traces of solvent vapors into the atmosphere.

Yet another object of the invention is to provide an improved method of and apparatus for the regeneration of an adsorbent particularly for use in association with dry-cleaning and degreasing machines, whereby the discharge into the environment of trichloroethylene, perchloroethylene and other organic dry-cleaning and degreasing solvents is minimized.

SUMMARY OF THE INVENTION

These objects and others which will become apparent hereinafter are obtained, in accordance with the present invention, in a system in which two receptacles are provided, in the manner described, one of which contains the adsorbent to be regenerated while the other contains an adsorbent in an adsorption mode, i.e. ready to receive air entraining solvent vapors to remove the same from the air. According to the present invention, when steam is admitted to the first receptacle to regenerate the adsorbent therein, the outlet of this receptacle is connected to the inlet of the other receptacle so that the expressed air, carrying solvent vapor residues, is fed to the adsorbent which is still capable of removing the solvent from the air before this quantity of air is recirculated to the machine for discharge.

According to an important feature of the invention, the advance of the steam front is detected and, when the steam reaches an appropriate point in the duct connecting the two receptacles, further admission of fluid from the outlet of the first receptacle to the inlet of the second receptacle is blocked and the steam is diverted to the condenser.

This arrangment thus ensures that the air driven out of the first receptacle will be subject to adsorption for removal of even traces of the solvent vapors therefrom while steam is precluded from entering the second receptacle so that the adsorbent there can operate in the normal manner for removal of solvent from the circulated air of the machine.

The system has been found to be free from any release of solvent residues into the environment, especially when in accordance with a specific feature of the invention, the air expunged from the first receptacle, after traversing the adsorption bed in the second receptacle is introduced into the closed circulated path of the air from and to the machine. Of course this air, following removal of the traces of solvent therefrom, can also be released into a special compartment, chamber or space from which air is drawn for circulation to the machine or into the first adsorption receptacle following the regeneration or during the latter.

In order to avoid a pressure increase or the development of excessive pressure with the closed gas circulating system of the machine, a portion of the air therein, following removal of solvent vapor residues therefrom can be vented to the atmosphere.

Thus the apparatus of the present invention can comprise two receptacles filled with adsorbent and the inlet and outlet ducts enabling these receptacles alternatively to be connected in a circulating path for air traversing the aforementioned machines, the ducts being provided with appropriate valves to enable the operating modes of the receptacles to be switched alternately, i.e. one receptacle to be used for adsorption while the adsorbent in the other receptacle is being regenerated.

The machine or machines with which a system of the present invention is associated can be any intended for the treatment of materials with organic solvents.

The system also includes conduits for feeding steam to and discharging steam from each of the receptacles while passing the steam through the adsorbent therein in a direction opposite to the direction of flow of the air therethrough during solvent-removing operations, these conduits being provided with valves for operation of the system in the alternative modes of regeneration and adsorption.

According to the invention, each steam outlet conduit is connectible through a respective valve with the air-inlet conduit of the other receptacle so that solvent-carrying air of the receptacle subjected to regeneration is displaced by the steam to the other receptacle, operated during an adsorption mode, a temperature sensor being provided along the latter duct to close the valve when the temperature reaches an elevated level indicating the presence of the steam front at the sensor.

The steam valve of each of the receptacles is thus connected with the outlet valve in the steam discharge line of the other receptacle so that opening of the first results in opening of the other with each of these outlet valves being closed in response to the detection of the steam front by a respective temperature sensor.

Thus the solvent-carrying air is displaced by steam from the receptacle and duct of the adsorbent to be regenerated if the steam front is detected and into the other receptacle for removal of solvent vapors by the other bed of adsorbent. When the steam front reaches the temperature sensor, this flow of fluid to the other receptacle is terminated, the outlet valve of the first receptacle is opened and the steam passes into the condenser. Within the condenser, in the usual manner, both water and solvent are condensed and the two liquids are then separated in the usual separator.

With the system of the present invention, the condenser is not subjected to overpressure and any underpressure will develop at most at the outlet side of the second receptacle, i.e. the receptacle to which the displaced air is supplied a vent can be provided at this location which is opened to relieve any excess pressure without danger that significant solvent vapors will be released into the atmosphere since the air has, at this point, already had the solvent vapors removed by the second bed of adsorbent.

It has been found to be especially effective for control of the pressure to provide a water seal at the air outlet sides of the two receptacles.

After the steam regeneration, the moist adsorbent in the receptacle treated with the steam can be dried with hot air or warmed gas. With the first quantity of air to traverse the adsorbent, a cloud of moisture is driven therefrom. In conventional systems, this nascent cloud is usually vented through the machine vent system and tends to result in deposition of droplets within the latter. With the system of the present invention, however, the drying of the adsorbent is effected in a closed circulating path which extends over the body of adsorbent through a condenser, blower and air heater back to the adsorbent so that no cloud of the type hitherto encountered need be released. Naturally, with this system, it is important to ensure that moisture from the condenser is not carried into the fan or blower to detrimentally affect the latter.

In order to protect the blower from moisture during the drying phase and from steam during the regeneration phase, a circulating path between the outlet of the condenser and the intake of the blower or fan is provided with a closable air-control device, which is only opened during most of the drying of the bed of adsorbent in the receptacle previously subjected to regeneration. This serves to prevent moisture from penetrating into the fan and as soon as the last traces of the steam cloud are collected in the condenser, the air-blocking device can be reopened.

In an especially advantageous embodiment of the present invention the air-blocking device is formed with air by a water seal provided in the interior of a housing containing a refrigerating or cooling system whereby the housing is connected through a closable valve to a water line and at its low point is connected by a further closable valve to a higher connecting location directly with a water separator. Furthermore, the housing is subdivided by a wall reaching downwardly to a location beneath the connecting point, into two separated compartments into which the water seal is divided, the compartment at one side of the wall being connected to the inlet connected with the adsorption receptacle and the cooling unit while the compartment on the other side of the wall are connected with the outlet of the housing communicating with the fan or blower. The first valve is opened when the second valve is closed and vice versa, i.e. both valves operate inversely.

This ensures protection of the blower, even when it is in the closed circuit with the adsorbent, from moisture.

The arrangement of an air blocking device in the condenser outlet, especially at a water seal in the condenser housing, is advantageous independently of the number and types of adsorption receptacles. The wall in the housing mentioned previously can be a tubular partition affixed to the cover of the condenser housing and reaching substantially into contact with the bottom, within this tubular shaft, the cover being connected to the outlet of the blower while outwardly of this tubular shaft the cooling unit and condenser inlets are connected.

BRIEF DESCRIPTION OF THE DRAWING

The above and other objects, features and advantages of the present invention will become more readily apparent from the following description, reference being made to the accompanying drawing in which:

FIG. 1 is a diagram illustrating a system having two active carbon receptacles in accordance with the present invention; and FIG. 2 is an illustration of the condenser of the device in greater detail and generally in diagrammatic cross section.

SPECIFIC DESCRIPTION

The installation illustrated in FIG. 1 comprises a pair of receptacles 1 and 2 each containing a bed 1a and 2a of activated-carbon adsorbent, generally between plenums 1b, 1c and 2b and 2c on opposite sides of the respective active carbon bed.

The apparatus is shown to be provided for a dry-cleaning machine which has been represented generally at 7 and which can have an outlet duct 11 for solvent-laden air which is to be subjected to adsorption, and an inlet duct 12 for the recirculated air freed from the adsorbent. The dry-cleaning machine 7 can be provided with the usual blower for effecting this closed circulation of air.

As pipe connections 11a and 12a, the adsorption and regenerating installation of the invention can be used for a number of dry-cleaning machines connected in parallel.

Reference may be had to U.S. Pat. No. 4,074,984 for a discussion of the principles of operation of a regenerating plant for dry-cleaning machines.

The dry-cleaning machine will usually have an outlet fitting 8, whose discharge rate is controlled by a flap-type valve 8a, connected to the line 11 and an inlet fitting 9, controlled by the flap-type valve 9a, connected to the pipe 12, the blower being represented generally at 10.

A pair of valves 3 and 5 respectively connect the receptacles 1 and 2 with duct 11 while valves 4 and 6 connect the receptacles with the duct 12.

If it is assumed that receptacle 1 is to be regenerated, valves 3 and 4 can be closed while valves 5 and 6 are open to allow the active carbon bed 2a to remain in a functionally effective state for the removal of solvent vapors from air circulated by the blower 10 via line 11 to receptacle 2 and back via line 12 to the dry-cleaning machines. When the active carbon bed 2a is to be regenerated, valves 5 and 6 are closed and valves 3 and 4 of the previously regenerated adsorbent are opened. The solvent plus air circulation is thus completely closed and no release of solvent vapors to the atmosphere can occur.

In the illustrated embodiment, when the adsorber 2 reaches saturation the adsorber 1 is switched into the closed solvent/air cycle by the opening of valves 3 and 4 and closing of valves 5 and 6.

The valves may be controlled by a programmer or sequencing switch 16' in response to a parameter, such as the residual solvent in air traversing an adsorber in the air-solvent cycle, or in response to the passage of a predetermined time.

For regeneration of the adsorber 2, valves 13, 14 and 15 are opened.

Steam from a line 17 is fed by the valve 15 through a steam heater 16 into a line 17' which also traverses an air heater 18 which is used subsequently for the drying of the regenerated adsorber. From line 17", the steam passes through valve 14 and into the regenerator 2, traversing the same in the direction opposite that which served for the flow of the air/solvent mixture previously, the steam driving residual air and traces of solvent through the valve 13 and into an opened valve 19 so that the expelled air/solvent mixture will traverse the adsorber 1. The air, free from solvent, then flows via valve 4 into the air/solvent cycle mentioned previously.

The valve 19 is opened concurrently with valve 13, these two valves being connected together by a switching mechanism 23 to the valves 19 and 13 by lines 21 and 22. Valve 20 remains closed during this operation.

A temperature sensor 25 is provided in line 24 and is connected to the switching device 23. When the temperature sensor 25 detects steam temperature in line 24, the switch 23 closes valve 19 while valve 13 remains open.

The steam, laden with solvent driven out of the adsorber 2, passes via line 28 to the condenser 29 which has been shown in greater detail in FIG. 2.

When, as the result of the displacement of air/solvent into the air/solvent cycle in the open condition of valve 19 results in an overpressure in this cycle, the excess pressure can be vented through a water seal 26 and a vent line 27 into the atmosphere from a location downstream of the adsorber bed 1a.

In the condenser 29, the steam and the solvent vapors are condensed and the liquid phase passes to a separator 38 from which the solvent is decanted from the water.

Naturally, the reverse operation occurs when the adsorber 2 is to be placed back in operation and the adsorber 1 is to be regenerated.

More specifically, valves 5 and 6 are opened and valves 3 and 4 are closed by the programmer 16'. Valves 15, 19 and 20 are opened and, simultaneously therewith, valve 13 is opened.

The steam then enters the adsorber 1 through valve 20 and displaces residual air from the body of the adsorbent through valve 10, line 24 and valve 13 into the adsorber 2 where this quantity of air is freed from the solvent vapors. Excess pressure is again vented by the water seal and the vent line 27. When the steam front reaches the temperature sensor 25, valve 13 is closed, whereupon the steam, now laden with solvent, is passed into condenser 29.

After the adsorber bed in the adsorber which has been regenerated with steam is practically freed from the solvent, air is displaced by the blower 30 upon opening of valve 31 and closure of valve 15 through air heater 18 to the respective adsorber as determined by the opening of one of the valves 14, 20.

At the beginning of this drying operation, a steam cloud is generated which passes into the condenser 29 which, for this reason, is provided with a water seal 31 (FIG. 2) preventing the passage of moisture and mist to the blower 30. A check valve 32 allows dry ambient air to be drawn into the drying-air path by the blower 30.

The condenser 29 (FIG. 2) is provided with an upstanding cylindrical housing with an axial center outlet 33 at its upper end connected directly via line 45 to the blower 30. A cylindrical wall, surrounding the outlet 33 extends downwardly from the top of the condenser into a body of water 31 forming the water seal and to a point close to but above the bottom of the receptacle.

The cylindrical wall 34 is surrounded by the cooling coils 35 of the condenser which are connected by lines 36 and 37 with the cooling water lines. A valve 44, controlled by the programmer 16' communicates between the location above the water level and the outlet line 33.

The condenser is provided with a lateral inlet 42 for the steam and air outwardly of the wall 34 and connected to the pipe 28.

The lower portion of the condenser housing 26 has a pipe 39 communicating with the water separator 38 and connected to the condenser via a valve 40 controlled by the programmer 16'.

Another pipe 41 communicates between the downstream side of this valve and the condenser outwardly of the wall 34 at a location above the bottom of this wall to establish the normal level of the water in the water seal.

During the initial air drying of the body of adsorbent when the mixture is displaced into the condenser, valve 44 in line 43 is opened and valve 40 is closed. The water seal rises to the level of the pipe 41 and the passage of steam or moisture-laden air to the blower is precluded.

When this mist no longer is produced and all moisture is collected in the condenser, valve 40 is opened and valve 44 is closed. The water seal is then drained and air can pass freely to the blower 30.

We claim:

1. An adsorber apparatus, especially for machines with organic solvents, comprising:

a pair of functionally interchangeable adsorbers each having a body of adsorbent, a first side for an air/vapor mixture to traverse the respective body, and a second side for air freed from said vapor upon traversal of the body;

a first and second valve respectively connecting said first side and said second side of each of said adsorbers in a closed air/vapor circulating path whereby the first and second valves of one of said adsorbers are closed for regeneration thereof when the first and second valves of the other adsorber are open for the removal of vapor therein;

a respective third valve connected to the first side of each adsorber and a respective fourth valve connected to the second side of each adsorber for passing steam therethrough upon regeneration of the respective adsorber;

a condenser connected to said adsorbers through said third valves;

a source of regenerating steam connectible to said adsorbers through said fourth valves;

means for communicating between said third valves of said adsorbers to permit steam admitted to one of said adsorbers to drive vapor-carrying air from said one of said adsorbers into the other of said adsorbers during the admission of steam to said one of said adsorbers for the regeneration thereof and for blocking communication between said adsorbers upon the displacement of air from said one of said adsorbers by the steam in response to an elevated temperature;

a blower connected to said condenser;

an air heater connected to said blower; and means connecting said air heater to said adsorber through said fourth valves, said condenser being provided with a controllable air-blocking device open only over a portion of the drying period for a regenerated adsorber with heated air, said device comprising a tube extending downwardly in said condenser to a location close to the bottom thereof and internally connected to said blower, a valve connecting the bottom of said condenser to a water separator, a cooling coil surrounding said tube and having a water inlet pipe and a water outlet pipe, and a further valve connecting said water outlet pipe with the interior of said condenser outwardly of said tube.

* * * * *